(12) United States Patent
Qu et al.

(10) Patent No.: US 9,151,526 B2
(45) Date of Patent: Oct. 6, 2015

(54) METHOD TO CONTROL ELECTRONIC EXPANSION VALVE

(75) Inventors: Yi Qu, Coppell, TX (US); Carl Crawford, Hickory Creek, TX (US)

(73) Assignee: Lennox Industries Inc., Richardson, TX (US)

( * ) Notice: Subject to any disclaimer, the term of this patent is extended or adjusted under 35 U.S.C. 154(b) by 580 days.

(21) Appl. No.: 13/335,391

(22) Filed: Dec. 22, 2011

(65) Prior Publication Data

US 2013/0160474 A1  Jun. 27, 2013

(51) Int. Cl.
F25B 41/06 (2006.01)
(52) U.S. Cl.
CPC ....... *F25B 41/062* (2013.01); *F25B 2341/0653* (2013.01); *F25B 2500/26* (2013.01); *F25B 2600/21* (2013.01); *F25B 2600/2513* (2013.01); *F25B 2700/1933* (2013.01); *F25B 2700/21151* (2013.01); *Y02B 30/72* (2013.01)
(58) Field of Classification Search
CPC .............. F25B 2341/064; F25B 2341/063; F25B 2600/2513; F25B 41/062; F25B 2500/26; F25B 2341/0653; F25B 2600/21; F25B 2700/21151; F25B 2700/1933; Y02B 30/72
USPC ........................................... 62/225, 222, 224
See application file for complete search history.

(56) References Cited

U.S. PATENT DOCUMENTS

| | | | |
|---|---|---|---|
| 2,512,561 A * | 6/1950 | Ziegler ............................ | 236/82 |
| 5,259,210 A | 11/1993 | Ohya et al. | |
| 5,735,134 A * | 4/1998 | Liu et al. ......................... | 62/230 |
| 5,771,703 A * | 6/1998 | Rajendran ....................... | 62/204 |
| 6,318,101 B1 | 11/2001 | Pham et al. | |
| 6,321,549 B1 | 11/2001 | Reason et al. | |
| 6,843,067 B2 | 1/2005 | Lee et al. | |
| 6,854,285 B2 * | 2/2005 | Jessen ............................. | 62/225 |
| 7,784,296 B2 * | 8/2010 | Chen et al. ...................... | 62/225 |
| 2006/0162358 A1 * | 7/2006 | VanderZee ...................... | 62/225 |
| 2007/0113568 A1 | 5/2007 | Jang et al. | |
| 2008/0023563 A1 | 1/2008 | Tamura | |
| 2009/0031740 A1 * | 2/2009 | Douglas ........................... | 62/225 |

FOREIGN PATENT DOCUMENTS

EP   1884726 A2   2/2008

\* cited by examiner

*Primary Examiner* — Allana Bidder
*Assistant Examiner* — Kun Kai Ma
(74) *Attorney, Agent, or Firm* — Winstead PC

(57) ABSTRACT

A vapor compression refrigeration cycle system includes a compressor and an electronic expansion valve connected between first and second refrigerant ports of a compressor. An expansion valve controller is configured to control a flow of refrigerant through the expansion valve in response to a superheat temperature of the refrigerant. The controller is configured to execute a first control algorithm until a local maximum of the superheat temperature occurs, and then to execute a second control algorithm.

20 Claims, 7 Drawing Sheets

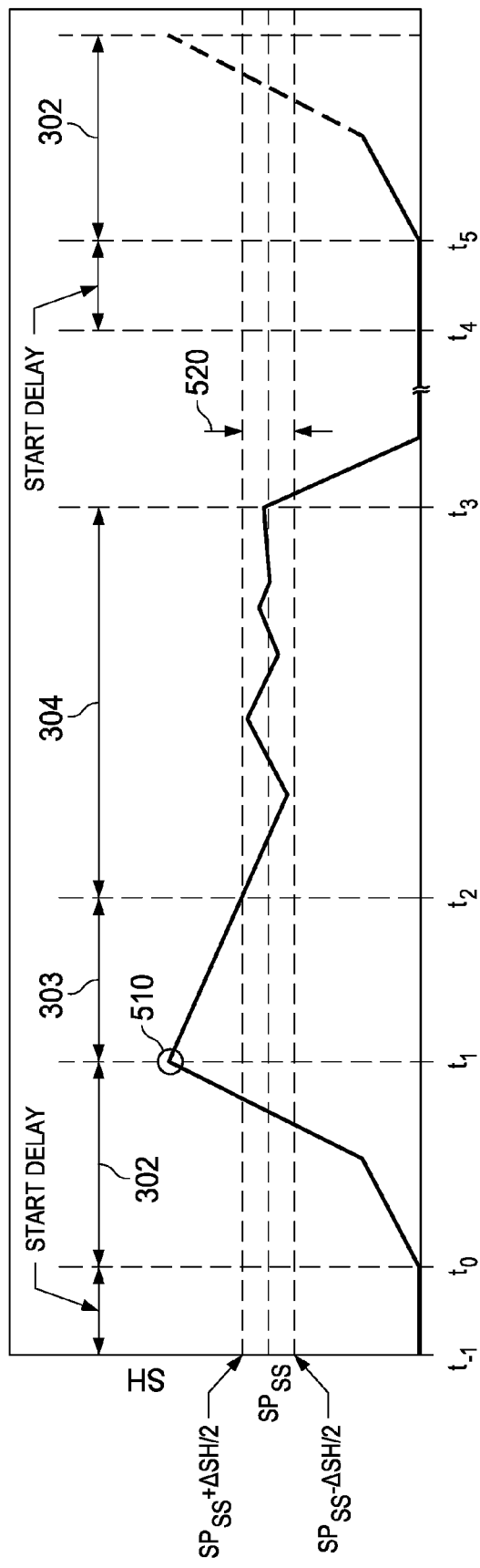

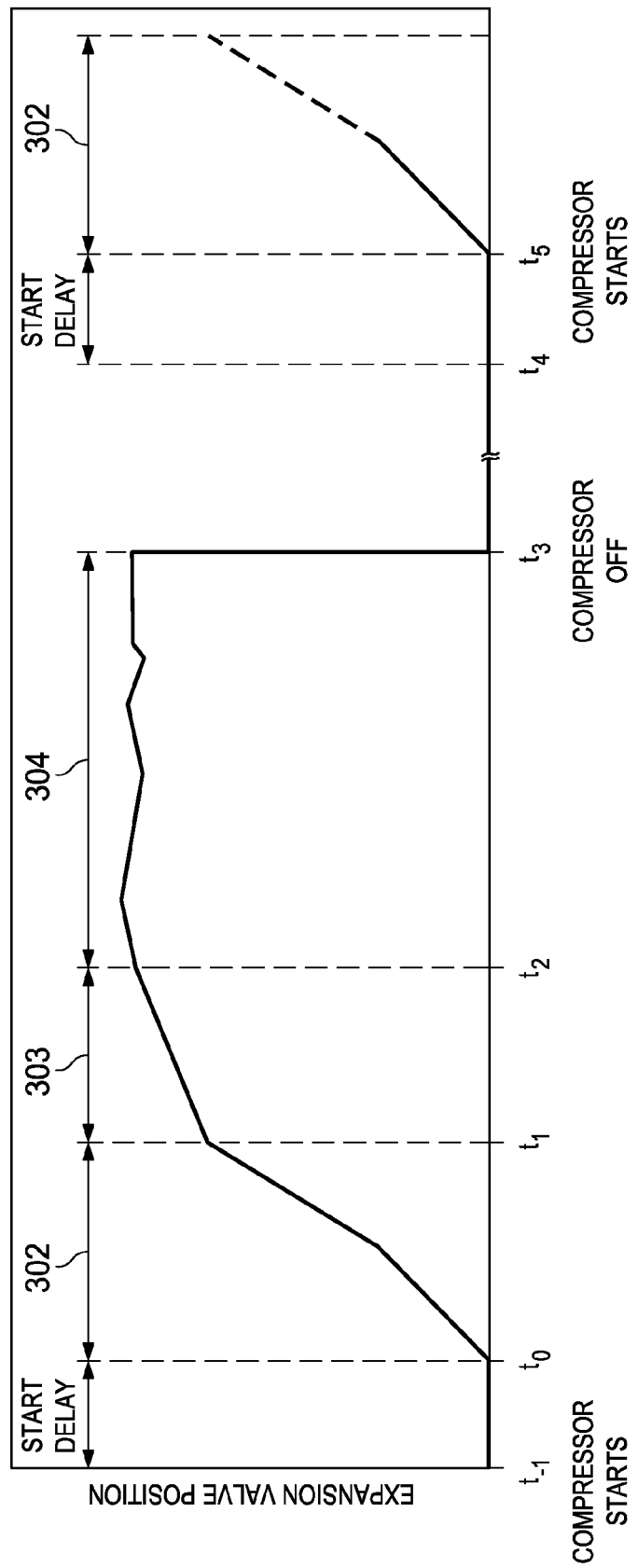

METHOD TO CONTROL ELECTRONIC EXPANSION VALVE

TECHNICAL FIELD

This application is directed, in general, to a heating, ventilating and air conditioning systems and, more specifically, to methods and systems for controlling an electronic expansion valve located in such systems.

BACKGROUND

A vapor compression refrigeration cycle system, such as an air conditioner, heat pump, or refrigeration system, typically utilizes a metering device to regulate the flow of refrigerant from a high-pressure side of the refrigeration loop to a low-pressure side. In some such systems the expansion valve is actively controlled, e.g. to compensate for changes of heat load on evaporator coils.

SUMMARY

One aspect provides a vapor compression refrigeration cycle system that includes a compressor and an electronic expansion valve connected between first and second refrigerant ports of a compressor. An expansion valve controller is configured to control a flow of refrigerant through the expansion valve in response to a superheat (SH) temperature of the refrigerant. The controller is configured to execute a first control algorithm until a local maximum of the superheat temperature occurs, and then to execute a second control algorithm.

Another aspect provides an electronic expansion valve controller. The controller includes a memory, an input interface and a processor. The memory is configured to store operating instructions of a control algorithm. The input interface is configured to receive sensory input indicative of a superheat temperature of a refrigerant. The processor is configured to, in response to the sensory input, execute the operating instructions and issue a control signal operable to control a stepper motor. The processor is further configured to execute a first control algorithm until a local maximum of the superheat temperature occurs, and then to execute a second control algorithm.

Yet another aspect provides a method of manufacturing a vapor compression refrigeration cycle system. The method includes configuring an electronic expansion valve to control a flow rate of refrigerant through a refrigerant line. An expansion valve controller is configured to execute a first control algorithm to increase the flow rate, thereby producing a local maximum of a superheat temperature of the refrigerant. The expansion valve controller is further configured to execute after the local maximum a second control algorithm to control a steady-state superheat temperature of the refrigerant.

BRIEF DESCRIPTION

Reference is now made to the following descriptions taken in conjunction with the accompanying drawings, in which:

FIG. 5A illustrates the superheat temperature in a hypothetical vapor compression refrigeration cycle system configured according to embodiments of the invention;

FIG. 5B illustrates the expansion valve position corresponding to the superheat temperature characteristic shown in FIG. 5A;

DETAILED DESCRIPTION

Actively controlled expansion valves are typically connected to a positioning motor, e.g. a stepper motor, which is in turn controlled by an electronic control system. Under some conditions, the load on the evaporator coils may change in a manner that results in a relatively large change of refrigerant flow in a short period. For example, a cooling load on a vapor compression refrigeration cycle (VCRC) system may fall as outside temperature conditions change. The VCRC system may respond by reducing the speed of a fan that moves air over the evaporator coils. In some cases the speed reduction may be great enough that the response of the conventional expansion valve controller includes undesirable control excursions, such as overshoot, ringing and oscillation of refrigerant characteristics such as pressure and/or superheat (SH) temperature. Such control excursions may cause, e.g. reduced system efficiency and possibly compressor damage if liquid refrigerant is allowed to enter the inlet side of the compressor.

Embodiments of the disclosure provide innovative control methods and systems that overcome many limitations of conventional expansion valve control. In one aspect, a control method includes a startup algorithm, a transition algorithm, and a steady-state algorithm. In various described embodiments the algorithms cooperate to provide rapid and well-controlled startup of a VCRC system with little or no overshoot or ringing of the control response, such as may occur in systems that use only a PID (proportional-integral-derivative) algorithm.

Figure 1:
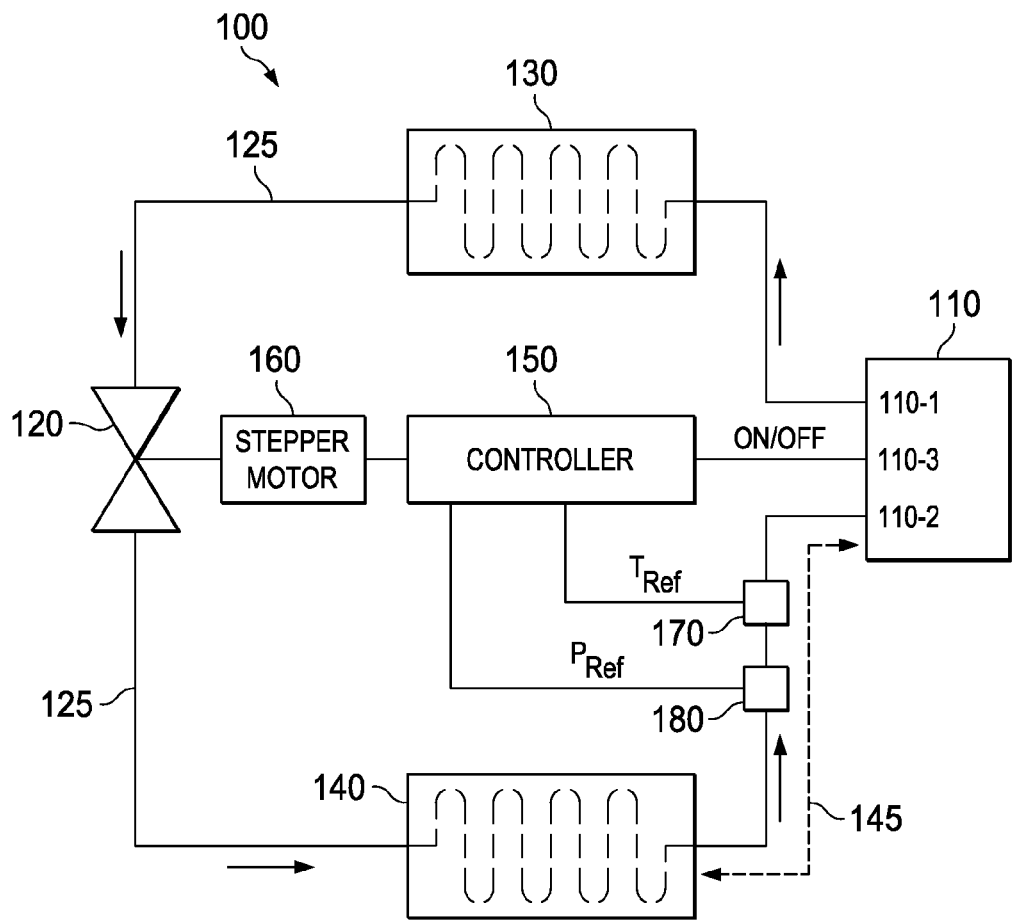
FIG. 1 illustrates a vapor compression refrigeration cycle (VCRC) system, e.g. an air conditioner, heat pump or refrigeration system, according to one illustrative and nonlimiting embodiment of the invention, including an electronic expansion valve.

Turning initially to FIG. 1, a VCRC system 100 is illustrated according to an illustrative and nonlimiting embodiment. The system 100 may be, e.g. a heat pump system. The system 100 includes a compressor 110 and an expansion valve 120 connected via a refrigerant line 125 between refrigerant ports of the compressor 110, e.g. an outlet 110-1 and an inlet 110-2. A first heat exchanger 130, e.g. a condensing coil, is connected between the expansion valve 120 and the compressor outlet 110-1. A second heat exchanger 140, e.g. an evaporator coil, is connected between the expansion valve 120 and the compressor inlet 110-2.

The compressor 110 may operate to circulate refrigerant from the compressor outlet 110-1, through the first heat exchanger 130, the expansion valve 120 and the second heat exchanger 140, with the refrigerant returning to the compressor via the compressor inlet 110-2. The circulation path includes a path segment 145, between the second heat exchanger 140 and the compressor outlet 110-1, referenced for later use in the description.

A fan (not shown) moves air over the heat exchanger 130, thereby removing heat produced by the compression of the refrigerant. The refrigerant cools when it expands at the outlet of the expansion valve 120 typically yielding a mixture of gaseous and liquid refrigerant. A blower (not shown) moves air over the heat exchanger 140, thereby cooling the air and warming the refrigerant. As the refrigerant warms some of the liquid refrigerant enters the gas phase.

A controller 150, discussed in detail below, is configured to operate a stepper motor 160 to open and close the expansion valve 120. The controller 150 receives a refrigerant temperature signal $T_{Ref}$ from a temperature sensor 170, and a refrigerant pressure signal $P_{Ref}$ from a pressure sensor 180. The controller 150 also receives a signal 110-3 from the compressor 110 that indicates whether or not the compressor 110 is operating.

It is often undesirable for liquid refrigerant to enter the compressor inlet 110-2. For example, because a liquid refrigerant may dilute the compressor oil in the compressor, the internal components of the compressor 110 may be impaired and compressor life could be reduced if liquid were allowed to enter the compressor inlet 110-2. The controller 150 is configured to substantially prevent this condition by controlling the expansion valve 120 to allow only as much refrigerant into the heat exchanger 140 as can be evaporated by absorbing heat from the air moving over the heat exchanger 140. Thus, substantially all of the refrigerant that enters the heat exchanger 140 is gaseous when it enters the compressor inlet 110-2.

However, the efficiency of heat transfer from the moving air to the refrigerant within the heat exchanger 140 is greater when liquid refrigerant is present in larger portion of the path within the heat exchanger 140. Conversely the efficiency of heat transfer is less when liquid refrigerant is present in a smaller portion of the heat exchanger 140 path.

A phase front may describe the point within the heat exchanger 140 at which substantially all the liquid refrigerant has become gaseous. Typically, the system 100 is operated such that the phase front is located close to the outlet end of the heat exchanger 140, but with a buffer to substantially prevent liquid refrigerant from emerging from the heat exchanger 140. Thus the refrigerant path between the outlet of the heat exchanger 140 and the compressor inlet 110-2 may be substantially free of liquid refrigerant when the refrigerant flow, Q, is properly metered by the expansion valve 120.

Within the path segment 145, the gaseous refrigerant may be superheated. As known to those skilled in the pertinent art, a superheat temperature is a measure of the temperature difference between the gaseous refrigerant and its equilibrium boiling point at the pressure it is subjected to. By definition the superheat temperature is zero when the liquid and gaseous phases of the refrigerant are in equilibrium.

When the refrigerant phase front is located nearer to the outlet of the heat exchanger 140, the superheat temperature within the path segment 145 is relatively low. Conversely, when the phase front is farther from the outlet, the superheat temperature is relatively high, e.g. because the gaseous refrigerant continues to absorb heat from the ambient as the refrigerant passes through the heat exchanger 140. A superheat temperature of zero with the path segment 145 indicates the presence of liquid refrigerant within the path segment 145.

The controller 150 may determine the superheat temperature from well known relationships using $T_{Ref}$ and $P_{Ref}$ respectively reported by the sensors 170 and 180. In other embodiments, a superheat temperature may be reported directly to the controller 150 by a device configured to calculate the superheat temperature from the temperature and pressure. The controller 150 may then control the expansion valve 120 via the stepper motor 160 to maintain a predetermined value of the superheat temperature within the path segment 145. This value is sometimes referred to herein as the steady-state superheat temperature, $SH_{SS}$. $SH_{SS}$ can be predefined by optimizing the system performance. Typically $SH_{SS}$ is selected as a balance between a low value, that improves system performance, and a value high enough that the electronic expansion valve has sufficient resolution to maintain operate at a consistent positive setting.

Figure 2:
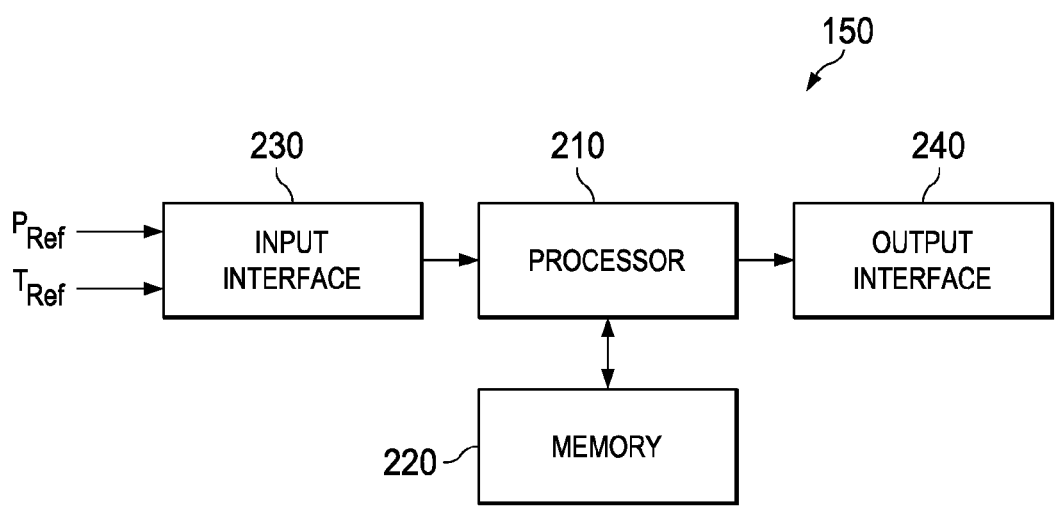
FIG. 2 illustrates a controller for an electronic expansion valve, e.g. the electronic expansion valve of FIG. 1.

FIG. 2 illustrates the controller 150 in greater detail. The controller 150 includes a processor 210 and a memory 220. The processor 210 may be any type of processor, e.g. a general microprocessor or microcontroller, an ASIC device configured to implement controller functions, a state machine, etc. Similarly the memory 220 may be any type or memory, e.g. static random access memory (SRAM), dynamic random access memory (DRAM), programmable read-only memory (PROM), flash memory and the like.

The memory 220 includes instructions that implement the various control functions provided by the controller 150. As discussed further below, the instructions implement a method that includes a plurality of algorithms to control the expansion valve 120 in various regimes of system 100 operation. Compared to conventional VCRC systems, the combination of the algorithms may provide for more efficient operation of the system 100 with a lower superheat temperature and a lower chance of liquid refrigerant returning to the compressor inlet 110-2.

An input interface 230 receives the refrigerant pressure ($P_{Ref}$) and temperature ($T_{Ref}$) signals and provides any necessary signal conditioning to make the data available to the processor 210. An output interface 240 receives a stepper motor control signal from the processor and provides any signal conditioning needed to make the motor control signal available to the stepper motor 160.

Figure 3:
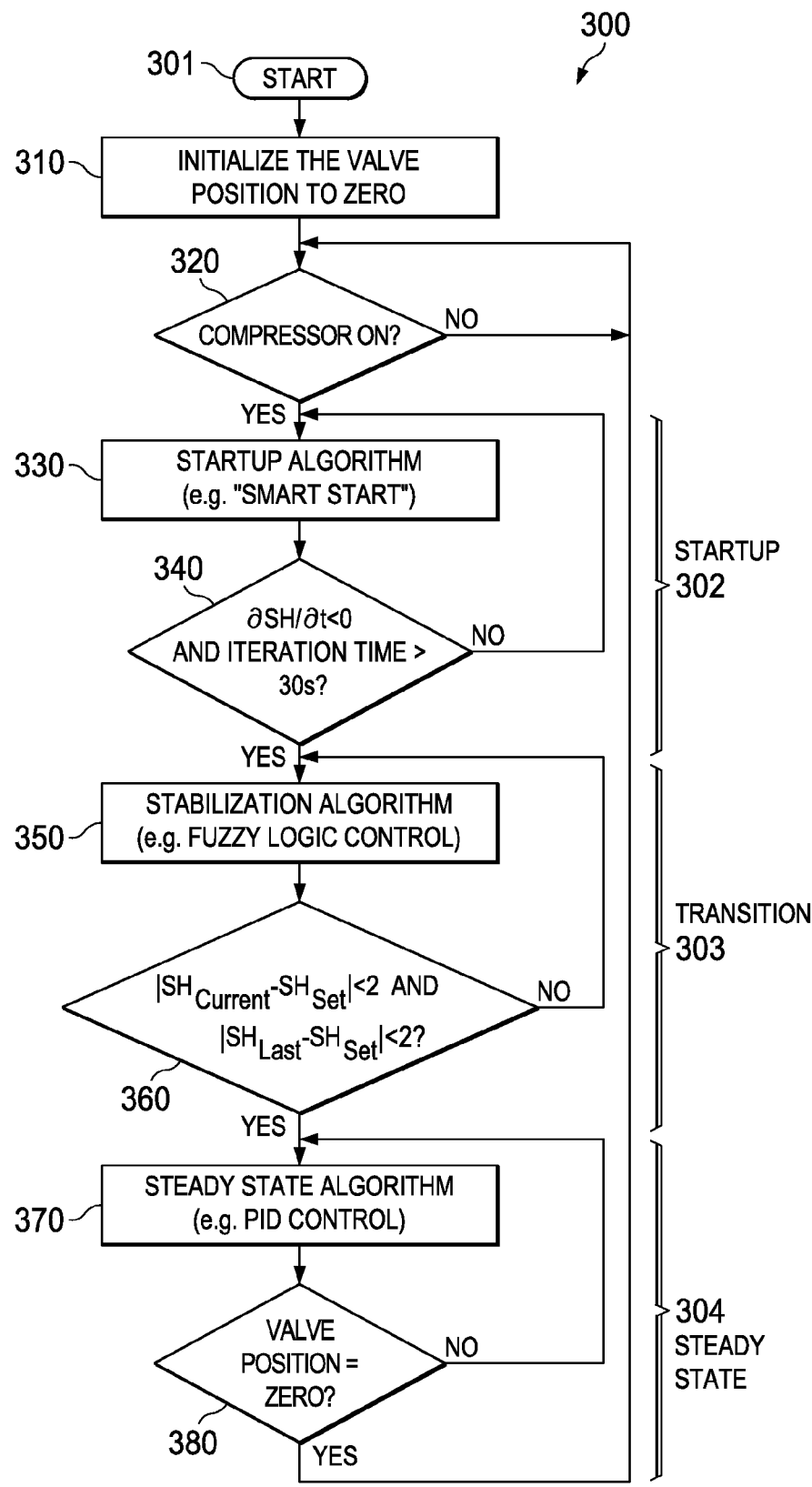
FIG. 3 illustrates a control algorithm executable by the controller of FIG. 2 in an illustrative and nonlimiting embodiment.

FIG. 3 illustrates a method 300 of the disclosure, e.g. an algorithm executed by the controller 150 to control operation of the expansion valve 120. Those skilled in the pertinent art will appreciate that the method 300 presents a subset of the steps and branches that a complete control program may include. Extraneous steps and branches are omitted for clarity. Methods within the scope of the disclosure may include any additional steps as needed to implement the described operation of the system 100. Moreover, the method 300 is described with reference to features of the system 100 (FIG. 1) and the controller 150 (FIG. 2) without limitation thereto.

The method 300 begins with an entry point 301, which may be reached as a subroutine call, or from a reset routine of the controller 150, e.g. after powering up the system 100. An initialization step 310 follows the entry point 301. In the step 310, the controller 150 initializes the expansion valve 120, e.g. by completely closing it to the flow of refrigerant. In a decisional step 320 the method 300 polls the signal 110-3 for operational status of the compressor 110. If the compressor 110 is not running, the method 300 remains at the step 320. When the controller 150 determines the compressor is operating, the method 300 advances to the first of a plurality of control stages.

In the illustrated embodiment the method 300 includes three control stages, but embodiments are not limited to any particular number thereof. These control stages are denoted a startup control stage 302, a transition control stage 303, and a steady-state control stage 304. The control stages 302, 303 and 304 are configured to bring the refrigerant superheat temperature to a steady-state superheat temperature, $SH_{ss}$, as quickly as possible while minimizing control excursions such as superheat overshoot, ringing and oscillation. Once the system is stabilized, the steady-state control stage 304 assumes control. In some embodiments, the transition control stage 303 may be omitted, such as when the startup control stage 302 is configured to bring the superheat temperature to a point at which the steady-state control algorithm can directly assume control.

Each of the control stages 302, 303, and 304 operate in a different control regime, e.g. a startup regime, a transition regime and a steady-state regime. The control algorithm executed by each control stage 302, 303, 304 is particular to the corresponding control regime. Thus, in the illustrated nonlimiting embodiment, the startup control stage 302 executes a startup algorithm, the transition control stage 303 executes a transition algorithm, and the steady-state control stage 304 executes a steady-state algorithm.

The startup algorithm provides a large time rate of change of the refrigerant flow rate Q, a large time rate of change of the superheat temperature, or both. The transition algorithm brings the superheat temperature from the value at the end of the startup algorithm to within a temperature range at which the steady-state algorithm is configured to maintain the superheat temperature during steady-state operation. The steady-state algorithm maintains the steady-state superheat value as constrained by the cooling load placed on the system 100.

The control stages 302, 303 and 304 are now addressed in greater detail. The control stage 302 begins when the controller 150 determines that the compressor 110 has started, e.g. from the signal 110-3. In a step 330 the control stage 302 executes the startup algorithm. In various embodiments the startup algorithm mimics aspects of control a human controller might provide. For example, the startup algorithm may be configured to anticipate the degree of control response needed to rapidly reach a desired steady-state value of SH. More specifically, the step 330 may control the flow rate Q such that the first derivative of Q with respect to time, $\dot{Q}$, is proportional to a second or higher-order derivative of SH with respect to time. Restated, $$\dot{Q} = C_1 \frac{\partial^2 SH(t)}{\partial t^2}, \quad (1)$$

where $C_1$ is a proportionality constant specific to the implementation of the system 100.

Thus, for example, when the system 100 initially starts, SH may increase from an initial value of zero, with a large instantaneous value of $\partial^2 SH/\partial t^2$. In such cases the controller 150 may open the expansion valve 120 rapidly to respond to the initial increase of SH. The rapid increase of Q is expected to substantially prevent the superheat temperature from significantly overshooting $SH_{ss}$.

As long as the slope of the SH characteristic is positive with respect to time, the startup algorithm directs the expansion valve 120 to open further, though the rate of increase may decline. The rapid increase of Q may cause SH to reach a local maximum value after which SH declines as the refrigerant phase front advances in the heat exchanger 140.

In a step 340 the control stage 302 may use this local maximum as one of one or more exit conditions. When the controller 150 detects that $\partial SH/\partial t$ has changed from positive to negative, the controller 150 may then also determine if a predetermined startup period $t_{delay}$ has expired. If the startup period has not expired the method 300 returns to the step 330.

Similarly, if $t_{delay}$ has expired, but no local maximum has been detected, then the method 300 returns again to the step 330. Conversely, if both $\partial SH/\partial t<0$ and $t>t_{delay}$, then the method 300 advances to the control stage 303.

The value of $t_{delay}$ will typically depend on the system 100 configuration. For instance, $t_{delay}$ may be a period determined to be longer than a startup period within which the system 100 may produce refrigerant pressure transients that could lead to spurious controller decisions in the absence of $t_{delay}$. In various embodiments a $t_{delay}$ value within a range form about 10 s to about 180 s is expected to provide an adequate margin against startup transients. In some such embodiments a startup delay within a range from about 20 s to about 60 s may be preferred, with a range from about 25 s to about 35 s being more preferred, and a startup delay of about 30 s being most preferred. For example, it may be preferable to keep the maximum time short to prevent excessive decline of SH and/or flooding the compressor 110.

Figure 4:
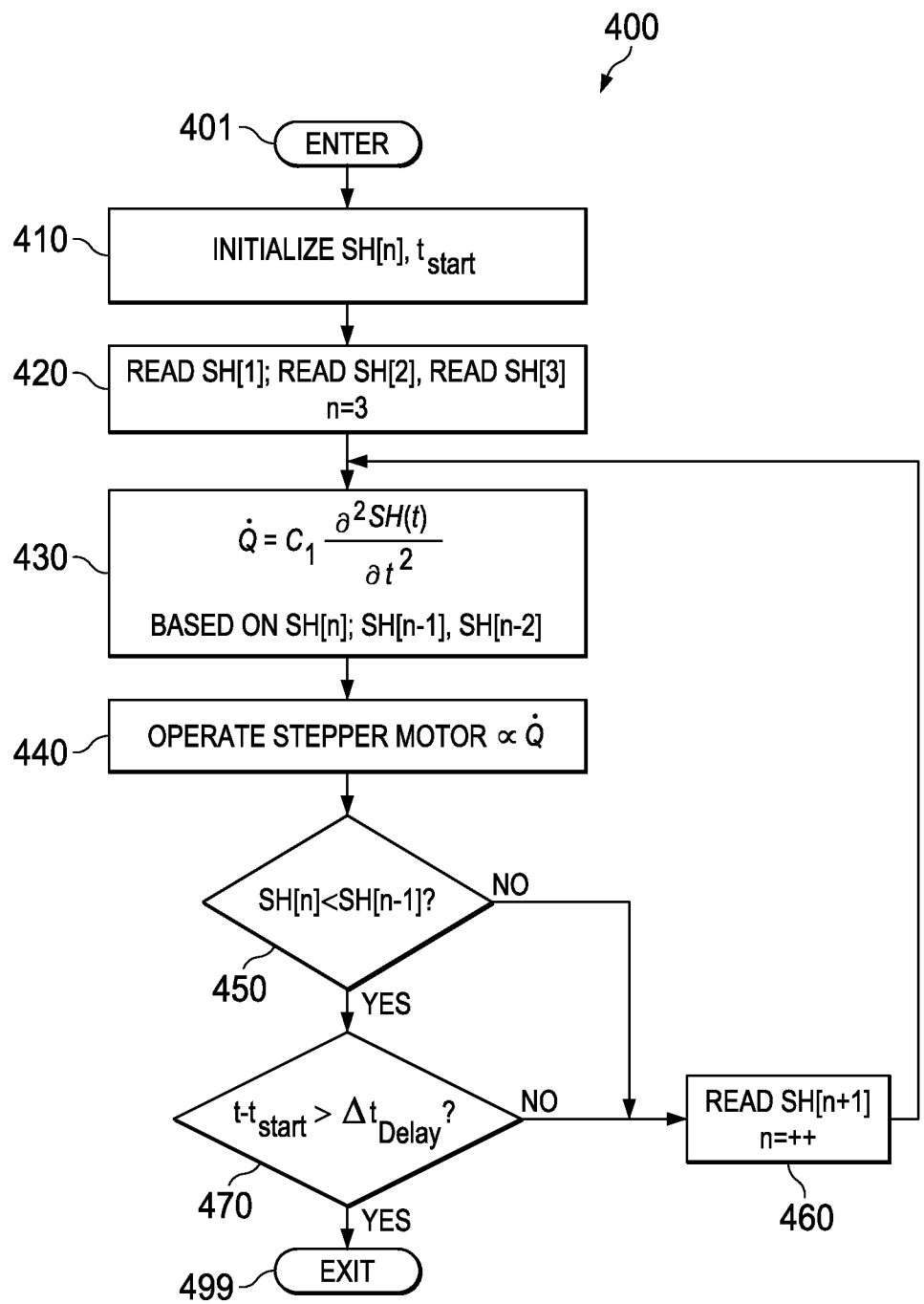
FIG. 4 illustrates a control algorithm configured to increase the superheat temperature of an VCRC system at system startup.

FIG. 4 illustrates a control method 400, e.g. as one nonlimiting embodiment of the startup control stage 302. The method 400 begins with an entry point 401. The controller 150 initializes an array SH[n] and a start time $t_{start}$ in a step 410, and reads three initial values SH[1], SH[2] and SH[3] in a step 420. There may be a delay (not shown) between 410 and 420 to allow the superheat temperature to increase, in some cases also allowing the system operation to stabilize faster. In a step 430 the controller calculates $\dot{Q}$ as shown in Eq. 1 based on the three immediately preceding SH values. The calculation may include, e.g. determining a first slope of SH between SH[1] and SH[2] and a second slope between SH[2] and SH[3] and determining a difference between the first and second slopes. In a step 440 the controller 150 operates the stepper motor 160 at a rate proportional to $\dot{Q}$.

In a decisional step 450 the controller 150 tests the most recent measurement of SH, SH[n], against the value of the immediately preceding value of SH, SH[n−1]. If SH[n] is not less than SH[n−1] then the control stage 302 advances to a step 460 in which the controller 150 reads the next value of SH, SH[n+1] and returns to the step 430. If instead SH[n] is less than SH[n] the control stage 302 advances to a decisional step 470. In some alternate embodiments the step 460 employs a sliding window to compute a moving average of the measured SH values. In the step 470 the controller 150 tests the current time t against $t_{start}$. If $t-t_{start}$ does not exceed $t_{delay}$ then the control stage branches to the step 460. If instead $t-t_{start}$ is greater than $t_{delay}$ then the control stage exits at an exit point 499.

Next the transition control stage 303 is described in greater detail. The transition control stage 303 executes the transition algorithm in a step 350. The transition algorithm may be any algorithm configured to control the expansion valve 120 to take the SH temperature from the value at the end of the control stage 302, e.g. below a lower control band value or above an upper control band value, to a value from which the steady-state control stage 304 may begin controlling with a small likelihood of producing overshoot or other undesirable control artifacts. In other words, the transition control stage 303 is configured to rapidly move the SH temperature to within the control band of the steady-state control stage 304, e.g. the steady-state control band, so that the steady stage control stage 304 may control without large control movements. Such control may include, e.g. increasing or decreasing the flow rate of the refrigerant after the occurrence of the local maximum of SH. However such increase or decrease may be at a rate other than $\propto \partial^2 SH/\partial t^2$.

Without limitation, in various embodiments the transition algorithm may use "fuzzy logic". Those skilled in the control arts will appreciate that fuzzy logic is a technique that extends Boolean logic to include the concept of "partial truth". In embodiments of the disclosure, the fuzzy logic control parameters may be set up at several different ranges of the superheat temperature. In some embodiments when the difference between the superheat temperature and $SH_{ss}$ is large, the controller 150 opens or closes the expansion valve 120 using a large step size. In this context, large may mean a few times greater than the control bands of the control algorithm used in the steady-state control stage 304. If instead the superheat temperature is near $SH_{ss}$, the controller 150 opens or closes the expansion valve 120 using a small step size. When the superheat temperature is close to $SH_{ss}$, e.g. at or within the control band of the steady-state control stage 304, e.g. within about ±2° F. (~±1° C.) of $SH_{ss}$, the controller 150 may exit the transition control stage 303 and begin operating in the steady-state control stage 304. By using fuzzy logic in the transition control stage 303, e.g. in combination with the startup control stage 302, the controller 150 may bring the superheat temperature to its steady-state operating value much faster than a conventional system that uses, e.g. only a PID control algorithm.

The transition control stage 303 ends when a condition tested by a decisional step 360 is met. In the illustrated embodiment the condition is the occurrence of at least two samples of the superheat temperature both being within a control band $\Delta SH_{ss}$ that includes a predetermined superheat operating setpoint In other words, the step 360 exits the transition control stage 303 when the Boolean expression $$\left\{|SH_{Current} - SH_{set}| < \frac{\Delta SH_{ss}}{2}\right\} \& \left\{|SH_{Last} - SH_{set}| < \frac{\Delta SH_{ss}}{2}\right\}$$

is true. Of course, other exit tests may be used without departing from the scope of the disclosure, such as using a moving average.

$SH_{set}$ is typically predetermined at a system design level by evaluating system performance as a function of $SH_{ss}$. $SH_{set}$ is typically set at as low a value as possible to achieve the highest system efficiency, but at a high enough value so that operation of the electronic expansion valve 120 has enough resolution to maintain a stable positive superheat temperature.

The control band may be, e.g., a range of SH values within which the steady-state control algorithm in a step 370 may assume control of the expansion valve 120 with a low likelihood of producing undesirable control excursions. This value also typically depends on system configuration, e.g. the ability of the system 100 to operate stably in the selected control band. For example, if $\Delta SH_{ss}$ is too small, the method 300 may never exit the transition control state 303. On the other hand if $\Delta SH_{ss}$ is too large the steady-state control stage algorithm may overshoot the control band when the steady-state algorithm assumes control. In consideration of these factors, in various embodiments it is preferred without limitation that $\Delta SH_{ss}$ be within a range of about 1° F. (~0.5° C.) to about 5° F. (~2.5° C.), with a range of about 1° F. (~0.5° C.) to about 3° F. (~1.5° C.) being more preferred, and a value of about 2° F. (~1° C.) being most preferred.

When the condition set in the step 360 is met, the method 300 advances to the steady-state control stage 304. In the step 370 the steady-state control stage 304 executes a steady-state control algorithm. In the illustrated embodiment the steady-state control algorithm is shown without limitation as a PID control algorithm. The steady-state control algorithm is configured to control the expansion valve 120 such that the SH value remains within the control band limits $\pm\Delta SH_{ss}/2$ on either side of $SH_{ss}$. The method 300 remains in the steady-state control stage 304 until, e.g. the expansion valve 120 is completely closed. This condition may occur at least under one of the following conditions, presented as examples without limitation.

First, the compressor 110 may be shut down, e.g. by a VCRC controller when the space cooled by the system 100 reaches a temperature set point. Second, the load on the system 100 may be suddenly reduced. As an example of the second case, the fan associated with the heat exchanger 140 may be a variable speed fan or the compressor 110 may be a variable speed compressor. In various circumstances the system 100 may switch from a high-capacity configuration (high compressor speed) to a low-capacity configuration (low compressor speed). In such circumstances the superheat temperature may rapidly fall to zero as the heat transfer to the refrigerant within the heat exchanger 140 is reduced. In either of these examples termination conditions the method 300 branches from the step 380 to the step 320 to reconfigure to the new steady-state conditions of the system 100.

FIG. 5A illustrates a plot of SH as a function of time for a hypothetical configuration of the system 100 to illustrate aspects of the response of the system 100 to control stages 302, 303 and 304. FIG. 5B illustrates a characteristic representing the position (e.g. fraction of full-open flow) of the expansion valve 120 corresponding to the case of FIG. 5A. The figures are described without limitation by reference to the system 100 and the method 300. The startup control stage 302 operates in a time period ranging from $t_0$ to $t_1$, the transition control stage 303 operates in a time ranging from $t_1$ to $t_2$, and the steady-state control stage 304 operates in a time range from $t_2$ to $t_3$.

Prior to a time $t_{-1}$ the compressor 110 may be off, so the method 400 may loop at the step 320. The compressor 110 is energized at $t_{-1}$ and the method 300 may advance to the step 330. During a start delay period between and $t_{-1}$ to the refrigerant pressure within the system 100 rises until the SH temperature begins to rise at $t_0$. At $t_0$ the controller 150 opens the expansion valve 120 as previously described until a local maximum 510 of SH is detected. The controller 150 switches to the transition control stage 303 at $t_1$, and continues to open the expansion valve 120 under control of, e.g. a fuzzy logic algorithm as the SH temperature falls. At $t_2$ the SH temperature crosses into a control band 520 of the SH temperature that includes the steady-state value $SH_{ss}$. The controller 150 switches to the steady-state control stage 304 and maintains SH within the control band while the expansion valve temperature remains relatively constant. At $t_3$ the compressor 110 shuts off. The controller 150 closes the expansion valve 120 and the SH temperature falls to zero as the refrigerant pressure bleeds off. The operating profile may repeat beginning at a time $t_4$ when the compressor 110 restarts.

Figure 6:
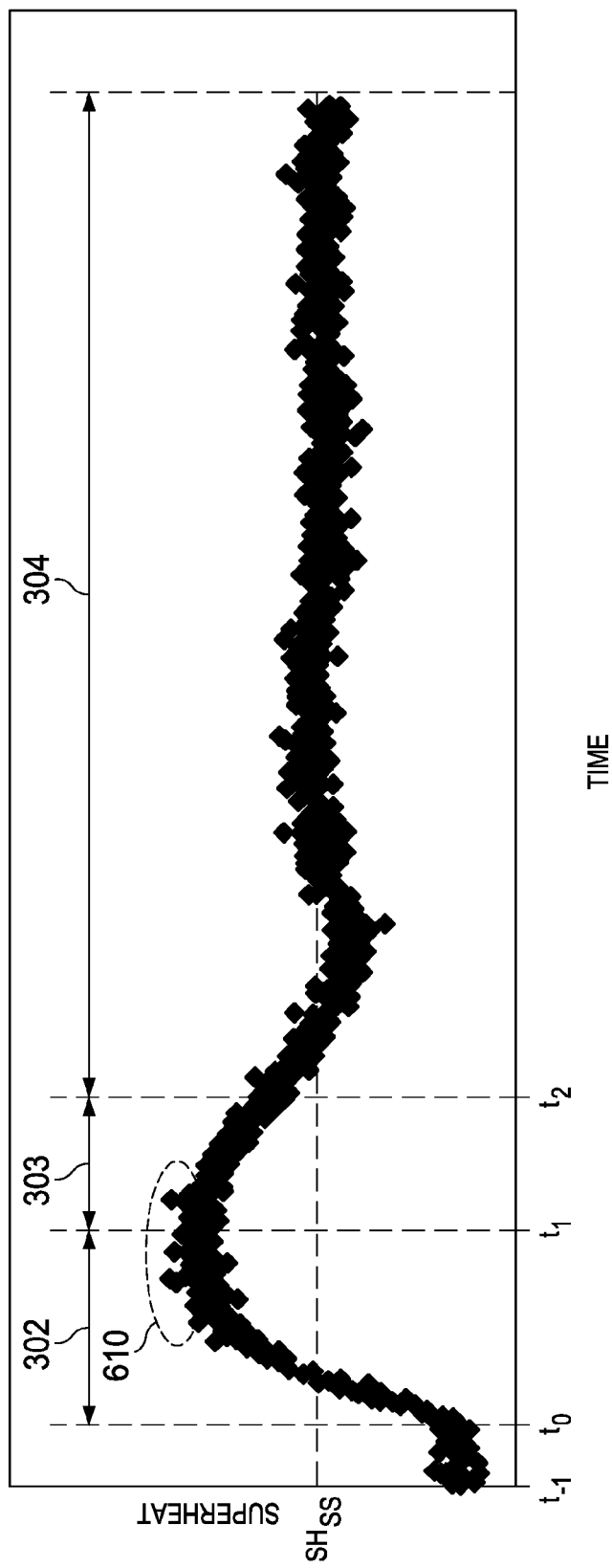
FIG. 6 illustrates an example of refrigerant superheat temperature of an illustrative tested system configured according to various embodiments described herein.

FIG. 6 illustrates without limitation an empirical characteristic of SH as a function of time for a tested prototypical instance of the system 100 operated using an embodiment of the control method 300. Previously described features are evident in the illustrated characteristic, including a local maximum 610, $SH_{ss}$, $t_0$, $t_1$ and $t_2$. The prototypical system operates in the startup control stage 302 in the time range $t_0 < t < t_1$, the transition control stage 303 from $t_1 < t < t_2$, and the steady-state control stage 304 for $t > t_2$. The local maximum 610 is clearly seen as the method 300 transitions from the control stage 302 to the transition control stage 303. The SH characteristic is also seen to transition smoothly from the transition control stage 303 to the steady-state control stage 304 and stabilize at the operating set point $SH_{ss}$ without control excursions.

Figure 7:
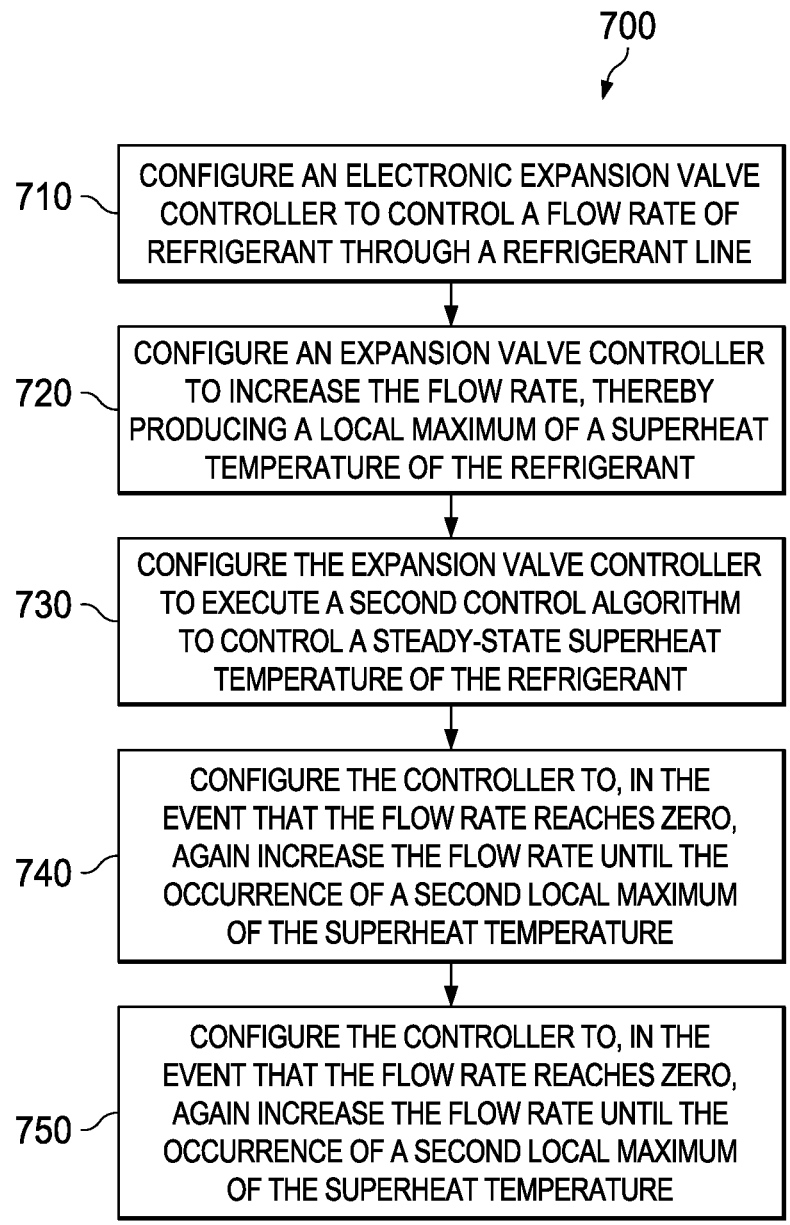
FIG. 7 illustrates a method of manufacturing a vapor compression refrigeration cycle system, e.g. the system 100 of FIG. 1.

Turning to FIG. 7, a method 700 of manufacturing a vapor compression refrigeration cycle system is presented. The method 700 may be described without limitation by reference to the system 100 and the methods 300 and 400. The steps of the method 700 may be performed in another order than the illustrated order, and in some embodiments may be omitted altogether.

In a step 710 an electronic expansion valve, e.g. the expansion valve 120, is configured to control a flow rate of refrigerant through a refrigerant line, e.g. the refrigerant line 125. In a step 720 an expansion valve controller, e.g. the controller 150, is configured to execute a first control algorithm, e.g. the startup algorithm 330, to increase the refrigerant flow rate, thereby producing a local maximum of a superheat temperature of the refrigerant, e.g. the local maximum 510. In a step 730 the expansion valve controller is further configured to execute after the local maximum a second control algorithm to control a steady-state superheat temperature of the refrigerant, e.g. the steady-state algorithm 370.

In a step 740 the controller is configured to execute a third control algorithm, e.g. the transition algorithm 350, to transition the superheat temperature from the local maximum to the steady-state superheat temperature.

In a step 750 the controller is configured to, in the event that the flow rate reaches zero, again increase the flow rate until the occurrence of a second local maximum of the superheat temperature.

Those skilled in the art to which this application relates will appreciate that other and further additions, deletions, substitutions and modifications may be made to the described embodiments.

What is claimed is:

1. A vapor compression refrigeration cycle system, comprising:
   a compressor having first and second refrigerant ports;
   an electronic expansion valve connected between said first and second refrigerant ports; and
   an expansion valve controller configured to control a flow of refrigerant through said expansion valve in response to a superheat temperature of said refrigerant,
   wherein said controller is configured to execute a startup control algorithm, after receiving a signal indicating that said compressor is running, that instructs said expansion valve to open thereby to increase a flow rate of said refrigerant as a function of said superheat temperature, said controller is configured to determine an occurrence of a local maximum of said superheat temperature when a first derivative of said superheat temperature changes from positive to negative and a current iteration time is greater than a predetermined startup time detected by said controller, said controller continues to execute a steady-state control algorithm, after said execution of said startup control algorithm, that controls said expansion valve such that said superheat temperature remains within predetermined control band limits.

2. The system as recited in claim 1, wherein said controller is configured to execute, a transition algorithm prior to execution of said steady-state control algorithm that brings said superheat temperature from a value at an end of said startup control algorithm to within a temperature range at which said steady-state control algorithm is configured to maintain said superheat temperature during execution of said steady-state control algorithm.

3. The system as recited in claim 1, wherein said controller is configured to return to said startup control algorithm in an event that said expansion valve reaches a zero flow condition after said controller executes said steady-state control algorithm.

4. The system as recited in claim 1, wherein when executing said startup control algorithm said controller opens said expansion valve at a rate proportional to a second derivative of said superheat temperature.

5. The system as recited in claim 1, wherein said steady-state control algorithm is a fuzzy logic algorithm.

6. The system as recited in claim 1, wherein said steady-state control algorithm is a proportional-integral-derivative control algorithm.

7. The system as recited in claim 1, wherein said controller is configured to ensure that said expansion valve is fully closed before executing said startup control algorithm.

8. An electronic expansion valve controller, comprising:
   a memory configured to store operating instructions of a control algorithm;
   an input interface configured to receive sensory input indicative of a superheat temperature of a refrigerant;
   a processor configured to, in response to said sensory input, execute said operating instructions and issue a control signal operable to control a stepper motor; and
   wherein said processor is configured to execute a startup control algorithm, after receiving a signal indicating that a compressor is running, that instructs an expansion valve to open thereby to increase a flow rate of said refrigerant as a function of said superheat temperature, said processor is configured to determine an occurrence of a local maximum of said superheat temperature when a first derivative of said superheat temperature changes from positive to negative and a current iteration time is greater than a predetermined startup time detected by said processor, said processor continues to execute a steady-state control algorithm, after said execution of said startup control algorithm, that controls said expansion valve such that said superheat temperature remains within predetermined control band limits.

9. The controller as recited in claim 8, wherein said controller is configured to execute, a transition algorithm prior to execution of said steady-state control algorithm that brings said superheat temperature from a value at an end of said startup control algorithm to within a temperature range at which said steady-state control algorithm is configured to maintain said superheat temperature during execution of said steady-state control algorithm.

10. The controller as recited in claim 8, wherein said controller is configured to return to said startup control algorithm in an event that said expansion valve reaches a zero flow condition after said controller executes said steady-state control algorithm.

11. The controller as recited in claim 8, wherein when executing said startup control algorithm said controller opens said expansion valve at a rate proportional to a second derivative of said superheat temperature.

12. The controller as recited in claim 8, wherein said steady-state control algorithm is a fuzzy logic algorithm.

13. The controller as recited in claim 8, wherein said steady-state control algorithm is a proportional-integral-derivative control algorithm.

14. A method of manufacturing a vapor compression refrigeration cycle system, comprising:
   configuring an electronic expansion valve to control a flow rate of refrigerant through a refrigerant line; and configuring an expansion valve controller to execute a startup control algorithm, after receiving a signal indicating that a compressor is running, that instructs said expansion valve to open thereby to increase a flow rate of said refrigerant as a function of said superheat temperature, said expansion valve controller is configured to determine an occurrence of a local maximum of said superheat temperature when a first derivative of said superheat temperature changes from positive to negative and a current iteration time is greater than a predetermined startup time detected by said expansion valve controller; and configuring said expansion valve controller to execute after said local maximum a steady-state control algorithm to control said expansion valve such that said superheat temperature remains within predetermined control band limits.

15. The method as recited in claim 14, further comprising configuring said controller to execute a transition algorithm prior to execution of said steady-state control algorithm that brings said superheat temperature from a value at an end of said startup control algorithm to within a temperature range at which said steady-state control algorithm is configured to maintain said superheat temperature during execution of state steady-state control algorithm.

16. The method as recited in claim 14, wherein said steady-state control algorithm executes until the occurrence of a terminating condition that includes said flow rate reaching zero.

17. The method as recited in claim 14, further comprising configuring said controller to, in an event that said flow rate reaches zero, again increase said flow rate until the occurrence of a second local maximum of said superheat temperature.

18. The method as recited in claim 14, wherein said startup algorithm is configured to increase said flow rate proportionate to a second derivative of said superheat temperature.

19. The method as recited in claim 15,
wherein said controller is configured to execute, a transition algorithm prior to execution of said steady-state control algorithm that brings said superheat temperature from a value at an end of said startup control algorithm to within a temperature range at which said steady-state control algorithm is configured to maintain said superheat temperature during execution of said steady-state control algorithm and wherein said transition algorithm employs a fuzzy logic algorithm.

20. The method as recited in claim 14, wherein said second control algorithm is a proportional-integral-derivative control algorithm.

\* \* \* \* \*

UNITED STATES PATENT AND TRADEMARK OFFICE
CERTIFICATE OF CORRECTION

PATENT NO. : 9,151,526 B2
APPLICATION NO. : 13/335391
DATED : October 6, 2015
INVENTOR(S) : Yi Qu et al.

It is certified that error appears in the above-identified patent and that said Letters Patent is hereby corrected as shown below:

In the Specification:

Column 8, Line 38    Replace "energized at $t_{=1}$" with -- energized at $t_{-1}$ --

Column 8, Line 39    Replace "between and $t_{-1}$ $t_0$" with -- between $t_{-1}$ and $t_0$ --

In the Claims:

Column 11, Lines 25-26,   Replace "during execution of state steady-state control algorithm."
Claim 15    with -- during execution of said steady-state control algorithm. --

Signed and Sealed this
Twenty-second Day of March, 2016

Michelle K. Lee
*Director of the United States Patent and Trademark Office*